United States Patent
Mufti et al.

(10) Patent No.: US 9,699,221 B2
(45) Date of Patent: Jul. 4, 2017

(54) TELECOMMUNICATIONS NETWORK EMERGENCY-CALL HANDOVER

(71) Applicant: T-Mobile USA, Inc., Bellevue, WA (US)

(72) Inventors: Shujaur Mufti, Snoqualmie, WA (US); Zeeshan Jahangir, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/815,831

(22) Filed: Jul. 31, 2015

(65) Prior Publication Data

US 2016/0037390 A1   Feb. 4, 2016

Related U.S. Application Data

(60) Provisional application No. 62/033,026, filed on Aug. 4, 2014.

(51) Int. Cl.
*H04M 11/04* (2006.01)
*H04L 29/06* (2006.01)
(Continued)

(52) U.S. Cl.
CPC ...... *H04L 65/1016* (2013.01); *H04L 65/1006* (2013.01); *H04L 65/1069* (2013.01);
(Continued)

(58) Field of Classification Search
CPC .... H04W 4/22; H04W 76/007; H04M 3/5116
See application file for complete search history.

(56) References Cited

U.S. PATENT DOCUMENTS

| 7,257,374 B1 | 8/2007 | Creigh |
| 8,995,959 B2 | 3/2015 | Cakulev et al. |

(Continued)

FOREIGN PATENT DOCUMENTS

| EP | 2667659 | 11/2013 |
| KR | 1020090065320 | 6/2009 |

(Continued)

OTHER PUBLICATIONS

"3GPP TS 24.229 V10.9.0", 3rd Generation Partnership Project; Technical Specification Group Core Network and Terminals; IP multimedia call control protocol based on Session Initiation Protocol (SIP) and Session Description Protocol (SDP); Stage 3 (Release 10), retrieved at <http://www.3gpp.org/DynaReport/24229.htm>>, Jun. 27, 2014, pp. 1-24, 58-59, 96-109, 145-151, and 216-218.

(Continued)

*Primary Examiner* — San Htun
(74) *Attorney, Agent, or Firm* — Lee & Hayes, PLLC; Robert C. Peck; Christopher J. White

(57) ABSTRACT

Telecommunications network components configured to manage a handover of a communication session, e.g., an emergency communication session, of user equipment are described herein. A core network device may transmit respective handover queries to a plurality of anchoring network devices following a handover request from user equipment. Each anchoring network device can provide a respective indication of whether the emergency communication session is being proxied by that anchoring network device. The core network device may transmit an invitation message to an anchoring network device in response to a positive indication from that anchoring network device. An anchoring network device may store in a memory an address of the anchoring network device in association with an address of the user equipment. The core network device may (Continued)

retrieve from memory the address of the anchoring network device and transmit an invitation message to the anchoring network device using the retrieved address.

20 Claims, 9 Drawing Sheets

(51) Int. Cl.
| | |
|---|---|
| H04W 4/22 | (2009.01) |
| H04W 76/00 | (2009.01) |
| H04W 60/00 | (2009.01) |
| H04W 88/18 | (2009.01) |
| H04W 60/06 | (2009.01) |
| H04W 36/00 | (2009.01) |
| H04W 76/04 | (2009.01) |

(52) U.S. Cl.
CPC .......... *H04W 4/22* (2013.01); *H04W 60/005* (2013.01); *H04W 76/007* (2013.01); *H04W 36/0016* (2013.01); *H04W 60/06* (2013.01); *H04W 76/041* (2013.01); *H04W 88/182* (2013.01)

(56) References Cited

U.S. PATENT DOCUMENTS

| | | | |
|---|---|---|---|
| 2004/0199641 | A1 | 10/2004 | Bajko |
| 2004/0199649 | A1 | 10/2004 | Tarnanen et al. |
| 2005/0071679 | A1 | 3/2005 | Kiss et al. |
| 2006/0084438 | A1 | 4/2006 | Kwon |
| 2006/0239229 | A1 | 10/2006 | Marinescu et al. |
| 2008/0039085 | A1 | 2/2008 | Phan-Anh |
| 2008/0089272 | A1 | 4/2008 | Ahokangas |
| 2008/0091814 | A1 | 4/2008 | Xie |
| 2008/0126535 | A1* | 5/2008 | Zhu .................... H04W 64/003 709/224 |
| 2008/0299927 | A1 | 12/2008 | Tenbrook et al. |
| 2009/0017824 | A1 | 1/2009 | Lee et al. |
| 2009/0296566 | A1 | 12/2009 | Yasrebl et al. |
| 2009/0296567 | A1 | 12/2009 | Yasrebi et al. |
| 2010/0054209 | A1* | 3/2010 | Mahdi ............... H04W 36/0022 370/331 |
| 2010/0223492 | A1 | 9/2010 | Farrugia et al. |
| 2010/0311386 | A1* | 12/2010 | Edge ................. H04W 36/0022 455/404.1 |
| 2010/0329243 | A1 | 12/2010 | Buckley et al. |
| 2010/0329244 | A1 | 12/2010 | Buckley et al. |
| 2011/0013597 | A1 | 1/2011 | Hwang et al. |
| 2011/0040836 | A1 | 2/2011 | Allen et al. |
| 2011/0040882 | A1 | 2/2011 | Delos Reyes et al. |
| 2011/0058520 | A1 | 3/2011 | Keller et al. |
| 2011/0230192 | A1 | 9/2011 | Tiwari |
| 2011/0296034 | A1 | 12/2011 | Mayer et al. |
| 2012/0039303 | A1 | 2/2012 | Stenfelt et al. |
| 2012/0069731 | A1 | 3/2012 | Tooher et al. |
| 2012/0083240 | A1 | 4/2012 | Patel |
| 2012/0258712 | A1 | 10/2012 | Rozinov |
| 2012/0295617 | A1 | 11/2012 | Anchan et al. |
| 2013/0021998 | A1 | 1/2013 | Shatsky |
| 2013/0023265 | A1 | 1/2013 | Swaminathan et al. |
| 2013/0029629 | A1* | 1/2013 | Lindholm ......... H04W 36/0022 455/404.1 |
| 2013/0051362 | A1 | 2/2013 | Lee et al. |
| 2013/0151586 | A1 | 6/2013 | Morishige et al. |
| 2013/0195076 | A1 | 8/2013 | Keller et al. |
| 2013/0329567 | A1 | 12/2013 | Mathias et al. |
| 2014/0051443 | A1 | 2/2014 | Diachina et al. |
| 2014/0064156 | A1 | 3/2014 | Paladugu et al. |
| 2014/0176660 | A1 | 6/2014 | Khay-Ibbat et al. |
| 2014/0370842 | A1* | 12/2014 | Abtin ................. H04L 65/1069 455/404.2 |
| 2015/0016420 | A1* | 1/2015 | Balabhadruni ......... H04W 4/22 370/331 |
| 2015/0024751 | A1 | 1/2015 | Wong et al. |
| 2016/0021579 | A1 | 1/2016 | Mufti |
| 2016/0021580 | A1 | 1/2016 | Mufti |
| 2016/0029228 | A1 | 1/2016 | Mufti |
| 2016/0037471 | A1 | 2/2016 | Mufti |
| 2016/0149965 | A1 | 5/2016 | Kubik et al. |
| 2016/0150497 | A1 | 5/2016 | Janosi et al. |
| 2016/0234744 | A1 | 8/2016 | Wu et al. |
| 2016/0249401 | A1 | 8/2016 | Tanaka et al. |

FOREIGN PATENT DOCUMENTS

| | | |
|---|---|---|
| KR | 1020100102363 | 9/2010 |
| WO | WO2007047477 | 4/2007 |
| WO | WO2012062379 | 5/2012 |
| WO | WO2013075746 | 5/2013 |
| WO | WO2013104651 | 7/2013 |
| WO | WO2013114158 | 8/2013 |
| WO | WO2013156061 | 10/2013 |

OTHER PUBLICATIONS

PCT Search Report and Written Opinion mailed Oct. 13, 2015 for PCT Application No. PCT/US15/38634, 11 pages.
PCT Search Report and Written Opinion mailed Oct. 15, 2015 for PCT Application No. PCT/US15/38652, 14 pages.
PCT Search Report and Written Opinion mailed Oct. 19, 2015 for PCT Application No. PCT/US15/39414, 12 pages.
PCT Search Report and Written Opinion mailed Nov. 11, 2015 for PCT Application No. PCT/US15/43467, 12 pages.
PCT Search Report and Written Opinion mailed Nov. 27, 2015 for PCT Application No. PCT/US15/43454, 10 pages.
Office action for U.S. Appl. No. 14/552,945, mailed on May 18, 2016, Mufti, "Telecommunication Equipment Measuring Pre-Establishment Service Interruptions", 29 pages.
"Digital cellular telecommunications system (Phase 2+); Universal Mobile Telecommunications System (UMTS); LTE; Mobile radio interface signalling layer 3;" General Aspects. 3GPP TS 24.007 V9.0.0. Oct. 2010. pp. 13, 15-17, 106-107.
Office action for U.S. Appl. No. 14/689,318, mailed on 10/41/2016, Mufti, "Telecommunications Network Non-Establishment Response", 18 pages.
Office action for U.S. Appl. No. 14/552,871, mailed on Oct. 6, 2016, Mufti, "Telecommunication Network Pre-Establishment Service Interruption Response", 23 pages.
Office action for U.S. Appl. No. 14/552,945, mailed on Nov. 30, 2016, Mufti, "Telecommunication Equipment Measuring Pre-Establishment Service Interruptions", 28 pages.

* cited by examiner

TELECOMMUNICATIONS NETWORK EMERGENCY-CALL HANDOVER

CROSS-REFERENCE TO RELATED APPLICATION

This application is a nonprovisional application of, and claims priority to and the benefit of, U.S. Patent Application Ser. No. 62/033,026, filed Aug. 4, 2014 and entitled "VoIte and Emergency Calling," the entirety of which is incorporated herein by reference.

BACKGROUND

Use of packet-switched connections for transmitting synchronous communications, such as voice calls, and data across telecommunications networks is increasing. Such packet-switched connections allow for greater speed and throughput than do circuit-switched connections, and also make packet-switched data from other networks, such as the Internet, more readily available. Most telecommunications networks, however, still utilize access networks that provide circuit-switched connections, such as Global System for Mobile Communications (GSM) networks or Universal Mobile Telecommunications System (UMTS) networks, due to the substantial infrastructure investment needed to expand packet-switched access networks. Such circuit-switched access networks may provide comparable or, at times, better speed and quality than packet-switched access networks for some types of data, including synchronous communications such as full-duplex voice communications.

Because packet-switched access networks are not available to the same extent as circuit-switched access networks, techniques have been developed for switching from one of type of packet-switched access network—e.g., the Long Term Evolution (LTE) access network—to circuit-switched access networks while maintaining continuity for a communication session, such as a voice call. An example of a communication session is an emergency call from a user to a Public Safety Answering Point (PSAP).

One technique for handover of a communication session from a LTE access network to a circuit-switched access network involves the use of the single radio voice call continuity (SRVCC) standard produced by the Third Generation Partnership Project (3GPP). With SRVCC, an eNodeB of a LTE access network determines that a communication session handover should occur based on a measurement report received from user equipment. The eNodeB communicates this to a mobility management entity (MME), which makes a handover request of a mobile switching center (MSC) server of a circuit-switched access network that is available to the user equipment. The MSC server (MSS) then prepares the circuit-switched access network for the handover, and communicates with an Internet Protocol (IP) multimedia subsystem (IMS) of the telecommunications network, the IMS maintaining continuity for the communication session during the handover. The MSS then sends a handover response to the MME, and the MME instructs the user equipment to connect to the circuit-switched access network to continue the communication session.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, a telecommunications network configured to manage a handover of a communication session of user equipment from a first access network to a second access network. Throughout this disclosure, the noun "call" is synonymous with "communication session" unless otherwise specified. The user equipment may be a cellular telephone, such as a feature phone or smartphone. The user equipment may provide a handover request to a server associated with the circuit-switched network, such as a MSS, receive a response from the server indicating that the circuit-switched access network has been prepared for the handover, and instruct the user equipment connect to the circuit-switched access network to continue the communication session.

In some examples, a core network device of a telecommunications network may receive a session-transfer indication of an emergency communication session of user equipment from a first access network of a first type to a second access network of a second, different type. Note that the term "emergency," as used herein, refers to the user's intent in calling (e.g., to reach authorities or first responders) or to the called party (e.g., a PSAP) and is not limited by the subject or contents of a particular emergency call. The core network device may query a plurality of anchoring network devices of the telecommunications network in response to the session-transfer indication. In some examples, a core network device may receive a session-transfer indication for an emergency communication session of the user equipment. The core network device may query a memory using the address of the user equipment to retrieve the address of an anchoring network device and transmit an invitation message to the anchoring network device using the retrieved address. The anchoring network device may receive a session-initiation message indicating an address of user equipment and store in the memory an address of the anchoring network device in association with the address of the user equipment.

Figure 1:
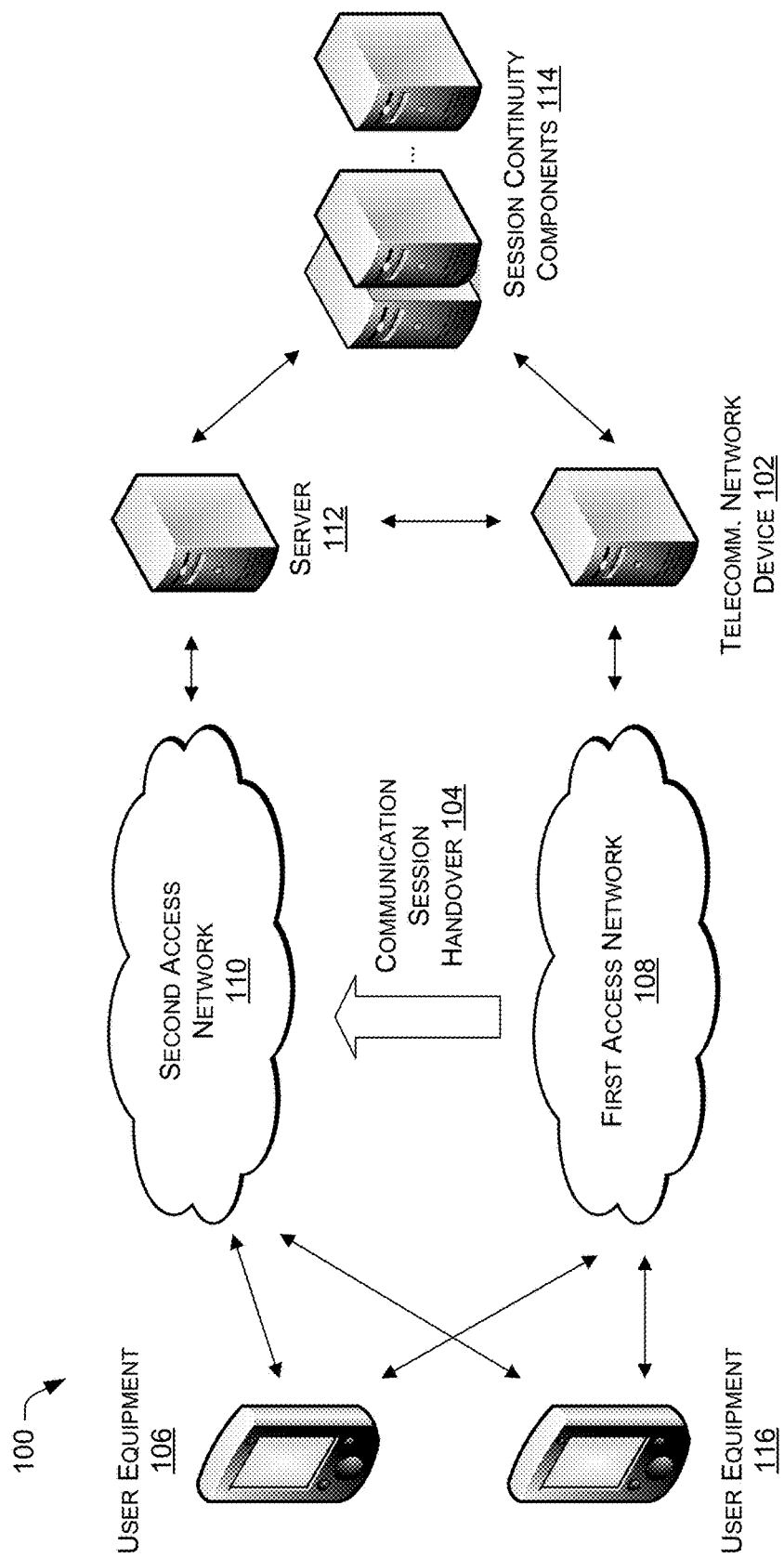
FIG. 1 illustrates an overview of devices involved in a handover of a communication session of user equipment from a packet-switched access network to a circuit-switched access network.

FIG. 1 illustrates an example telecommunications network 100 and shows an overview of devices involved in a handover of a communication session of user equipment from a first access network of a first type to a second access network of a second, different type. The first type may be a packet-switched (PS) type (e.g., LTE) and the second type may be a circuit-switched (CS) type (e.g., GSM). The access network to which the user equipment is handed over is referred to herein as the target access network of the target type (e.g., PS or CS). As shown in FIG. 1, a telecommunications network device 102 may initiate a handover 104 of a communication session of user equipment 106 from first access network 108 to second access network 110. As part of the handover 104, the telecommunications network device 102 (e.g., an MME) may provide a handover request to a server 112 (e.g., an MSS) that is associated with the second access network 110. The server 112 may then prepare the second access network 110 for the handover 104 and communicate with one or more session continuity components 114 to ensure continuity of the communication session during the handover 104. The server 112 then responds to the telecommunications network device 102, and the telecommunications network device 102 instructs the user equipment 106 to connect to the second access network 110 to continue the communication session. The telecommunications network device 102 and the server 112 are examples of access devices that control or modify communications between user equipment 106 and access network(s) 108 or 110.

Throughout this disclosure, handover 104 is described in the example of a handover from packet-switched first access network 108 to circuit-switched second access network 110. However, handover 104 is not limited to that example. Handover 104 in various examples can be a handover from a circuit-switched access network to a packet-switched access network, or in general between a first access network of a first type and a second access network, e.g., of the first type or of a second, different type. Example network types may include WI-FI networks carrying voice-over-Internet-Protocol (VoIP) communication sessions, wireline networks such as Ethernet, or wireless networks such as those used for communications via non-geostationary satellites.

The user equipment 106 may be any sort device capable of cellular or wireless network communication, such as a cellular phone, a tablet computer, a personal digital assistant (PDA), a personal computer (PC), a laptop computer, a media center, a work station, etc. Example user equipment 106 is described below with reference to FIG. 3.

In some embodiments, the user equipment 106 may have a radio and be configured to tune that radio to licensed wireless spectrum utilized by circuit-switched access networks and packet-switched access networks, such as LTE access networks. The user equipment 106 may also be configured to tune the radio to wireless spectrum utilized by packet-switched access networks, such as GSM access networks or UMTS access networks. When equipped with a single radio, the user equipment 106 may only be connected to one of these access networks at a time.

Figure 2:
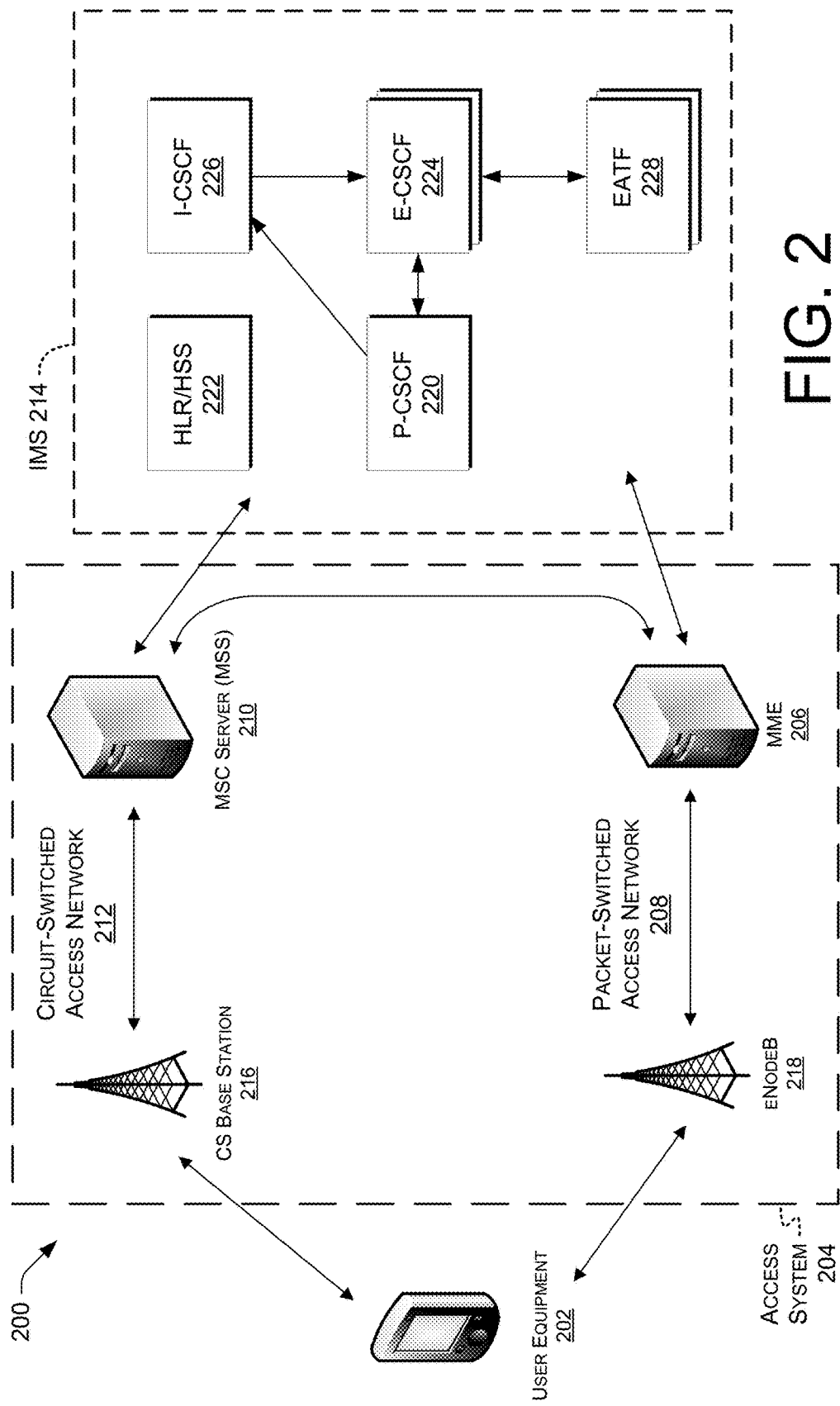
FIG. 2 illustrates an example telecommunications network, including components used to maintain continuity of the communication session during handover of the communication session.
Figure 3:
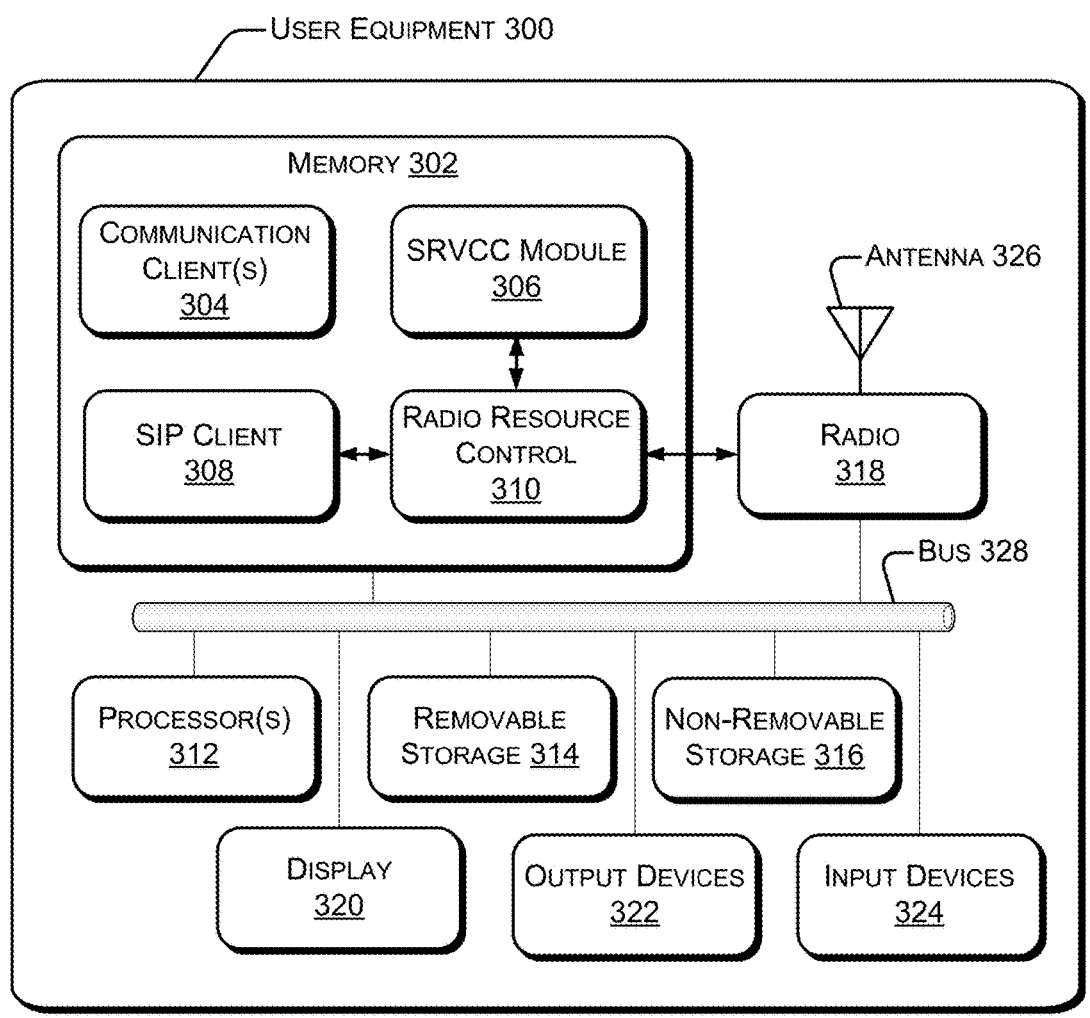
FIG. 3 illustrates a component level view of user equipment capable of connecting to a plurality of access networks, of measuring those access networks, of providing measurement reports, of engaging in a communication session, and of switching access networks during the communication session.
Figure 4:
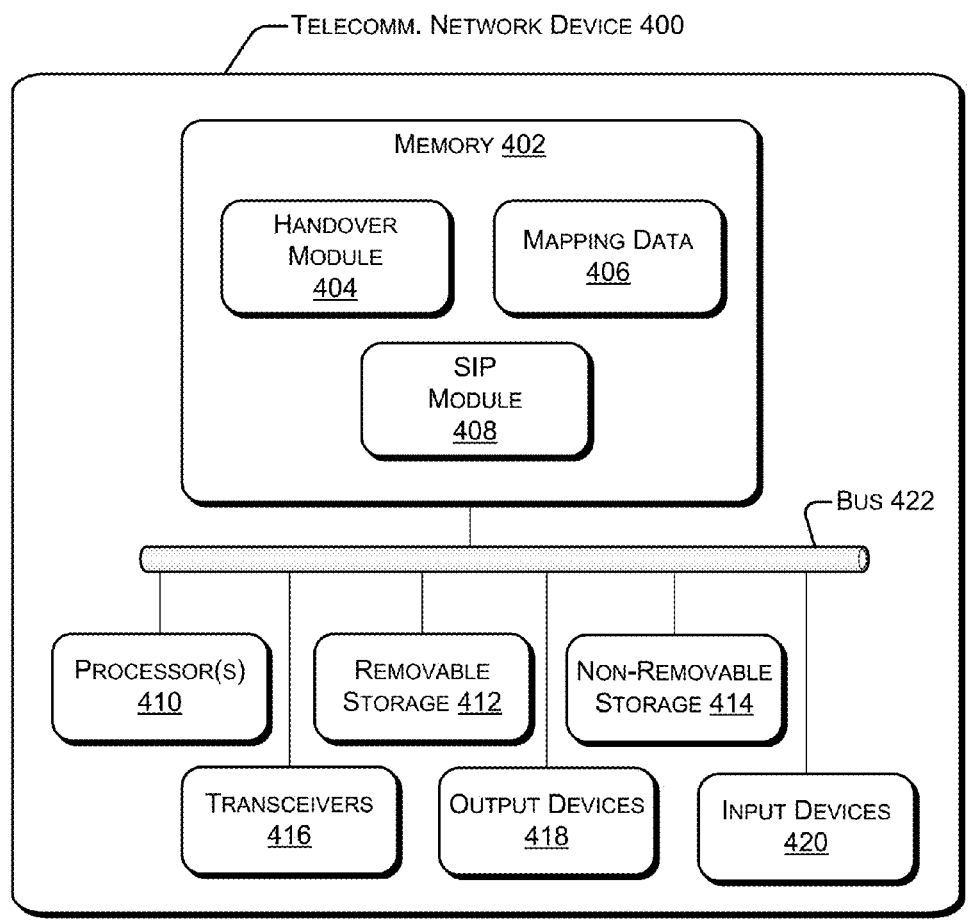
FIG. 4 illustrates a component level view of a telecommunications network device capable of initiating and managing a handover of a communication session of user equipment, e.g., from a packet-switched access network to a circuit-switched access network.

The user equipment 106 may further be configured to initiate or receive a communication session, such as a voice call, a video call, or another sort of synchronous communication. The communication session may include an emergency call, e.g., to a number such as "9-1-1" or "1-1-2." Initiation of such communications may involve communication clients and session initiation protocol (SIP) clients to communicate with session continuity components 114 of the telecommunications network. Both the initiation of a communication session and the components involved in the initiation are illustrated in FIGS. 2, 3, and 4 and described in further detail herein.

In various embodiments, the user equipment 106 may measure access networks that are proximate to the user equipment 106 and provide measurements of those access networks in a measurement report to a device of the telecommunications network, such as telecommunications network device 102. The measurements may include signal strength, packet loss, packet discard, or network congestion. The proximate access networks may include both access networks that are detected by the user equipment 106 and those of neighboring cells, which the user equipment 106 may learn of from the telecommunications network.

The user equipment 106 may initiate the communication session using a connection to the first access network 108. The first access network 108 may be secured using, for example, information from a Subscriber Identity Module (SIM) card of the user equipment 106, or may be non-secured. The first access network 108 connects the user equipment 106 to a telecommunications network. A routing device of the first access network 108 may communicate with a device of the telecommunications network, such as the telecommunications network device 102.

The telecommunications network device 102 may include a gateway device, such as an Evolved Packet Data Gateway (ePDG). An example telecommunications network device 102 is illustrated in FIG. 4 and described below with reference to that figure. Further, the telecommunications network device 102, as well as the server 112 and the session continuity components 114, may each be or include a server or server farm, multiple, distributed server farms, a mainframe, a work station, a personal computer (PC), a laptop computer, a tablet computer, an embedded system, or any other sort of device or devices. In one implementation, one or more of telecommunications network device 102, the server 112, and the session continuity components 114 may represent a plurality of computing devices working in communication, such as a cloud computing network of nodes. Also, the telecommunications network device 102, the server 112, and the session continuity components 114 may each be or include devices of a telecommunications network. Examples of the telecommunications network device 102, the server 112, and the session continuity components 114 are illustrated in FIG. 2 and are described in greater detail with reference to that figure.

In various embodiments, the telecommunications network device 102 may enable the user equipment 106 to initiate the communication session by passing messages to appropriate device(s) of the telecommunications network, such as the session continuity components 114. The telecommunications network device 102 may also receive measurement reports from the user equipment 106 and may apply one or more models, thresholds, rules, or criteria to the measurements included in the measurement reports to determine whether a handover 104 is appropriate. For example, if the signal strength of the first access network 108 falls below a threshold, the telecommunications network device 102 may initiate the handover 104. In other embodiments, the telecommunications network device 102 may select a second access network 110 that is not included in the measurement reports to receive the handover. For example, the measurement reports may include measurements associated with the first access network 108, but no measurements for the second access network 110. The telecommunications network device 102, as part of the telecommunications network, may have access to measurements of the second access network 110, however, and may use those measurements in conjunction with those provided in the measurement reports in making a handover decision.

Upon initiating a handover 104, the telecommunications network device 102 selects a second access network 110 to transition the communication session to. For example, the telecommunications network device 102 may select the second access network 110 based on signal congestion levels of several second access networks included in the measurement report. The telecommunications network device 102 may then determine the server 112 associated with the selected second access network 110 by referencing mappings, such as a table.

As part of the handover 104, the telecommunications network device 102 may send instructions to the user equipment 106 preparing the user equipment 106 for the handover 104. Such instructions may include a directive to automatically tune the radio of the user equipment 106 to the second access network 110 if the user equipment 106 has not heard from the telecommunications network device 102 within a threshold period of time.

The telecommunications network device 102 then sends a handover request, such as an SRVCC PS to CS request. The request may be made over an interface between the telecommunications network device 102 and the server 112. In an example, the telecommunications network device 102 can be or include an MME, which may have an Sv interface with the server 112. The handover request may include at least information identifying the user equipment 106, such as an international mobile subscriber identity (IMSI), information identifying the communication session, such as a correlation mobile station international subscriber directory number (C-MSISDN), and an identifier of the session continuity components 114, such as a session transfer number-single radio (STN-SR).

In some embodiments, the server 112 may be or include an MSS associated with the second access network 110, e.g., a CS access network. The second access network 110 may be any sort of second access network 110, such as a GSM or UMTS network. The second access network 110 may also be referred to as a universal terrestrial radio network (UTRAN) or a GSM EDGE radio access network (GERAN) and may include a base station or NodeB, as well as a radio network controller (RNC). The second access network 110 may provide circuit-switched connections over a given signal spectrum and may use any sort of air interface, such as a code division multiple access (CDMA), time division multiple access (TDMA), or frequency division multiple access (FDMA) air interface. Communications received by the second access network 110 from the user equipment 106 are transmitted to server 112 of the telecommunications network.

Upon receiving a handover request, the server 112 prepares the second access network 110 for the handover 104 by, for example, allocating resources at a base station and RNC of the second access network 110. The server 112 also uses the identifier of the session continuity components 114 included in the handover request to request that the session continuity components perform a session transfer. The session transfer enables the handover 104 to occur without loss of continuity to the communication session.

In various embodiments, the session continuity components 114 represent components of an IMS of the telecommunications network. Examples of such components, and of the session transfer, are described further herein. Upon receiving a session transfer request from the server 112 and performing the session transfer, the session continuity components 114 respond to the server 112, indicating completion of the session transfer.

In further embodiments, upon receiving a response indicating completion of the session transfer, and after preparing the second access network 110 for the handover 104, the server 112 (e.g., an MSS) sends a handover response, such as an SRVCC PS to CS response, to the telecommunications network device 102 (e.g., an MME). The telecommunications network device 102 then instructs the user equipment 106 to tune its radio to the second access network 110 in order to connect to the second access network 110 and continue the communication session. Upon receiving such instructions, the user equipment 106 carries them out, completing the handover 104.

A handover 104 can be initiated at any time during an emergency call or other persistent communication session. As noted above, the Session Initiation Protocol (SIP, RFC 3261) can be used to establish and manage communication sessions. A communication session typically passes through several phases over its life. These are described with reference to a voice call in the circuit-switched domain but are not limited thereto. For LTE, the phases are defined in 3GPP TS 24.237 version 12.6.0 Release 12, p. 19 and in 3GPP TS 24.229 version 10.9.0 Release 10, pp. 96-98, or subsequent versions of those standards.

To initiate a communication session, e.g., in response to a user's dialing a phone number (e.g., "9-1-1"), originating user equipment 106 sends a SIP INVITE request via first access network 108 to terminating user equipment 116. This begins a "pre-alerting" phase of the session in some examples. In some examples, pre-alerting begins when the terminating user equipment 116 responds with a SIP 100 Trying, a SIP 183 Session in Progress, or both. The terminating user equipment 116 responds with a SIP response carrying a 180 response code, signifying "Ringing." This begins an "alerting" phase of the session, during which the terminating user equipment 116 provides an indication that a call is incoming. Examples of indications include vibrations and audible ringtones. The SIP response is referred to as a "SIP 180 Ringing response", and likewise for other SIP response codes described herein. As used herein, a SIP response code ending in "xx", e.g., a SIP 1xx Provisional response, signifies any response of, e.g., class 1 of SIP responses (RFC 3261, §7.2).

When terminating user equipment 116 accepts the communication session (e.g., a user of device 116 chooses to answer the call), terminating user equipment 116 sends a SIP 200 OK response to originating user equipment 106. This begins an "established" phase of the communication session, during which data can be exchanged between originating user equipment 106 and terminating user equipment 116. In an example, the data includes digitized audio of a voice call. The alerting and pre-alerting phases are referred to collectively as a "pre-establishment phase." The pre-establishment phase corresponds to a SIP "early dialog state" and the established phase corresponds to a SIP "confirmed dialog state" (RFC 3261, §12). Handover 104 may occur during the pre-establishment phase or the established phase.

In some examples, SIP requests and responses may pass to or through various SIP proxies, user-agent servers or clients, or back-to-back user agents (B2BUAs). As used herein, an "anchoring network device" is a session continuity component 114 through which SIP traffic for a communication session passes for the duration of the established phase. That session is "anchored" at the anchoring network device. Anchoring SIP traffic for a session can increase network robustness by isolating the two sides of the anchoring network device. For example, terminating user equipment 116 is not required to change its SIP route to originating user equipment 106 when originating user equipment 106 is handed over from first access network 108 to second access network 110, since that SIP route passes through an anchoring network device of the session continuity components 114. In some examples, anchoring takes place in response to receipt by a session continuity component 114 of a SIP INVITE, and the session continuity component 114 transmits a SIP 183 Session in Progress once anchoring is complete, i.e., once session continuity component 114 has recorded an indication that the communication session is anchored at that session continuity component 114.

In some example networks, emergency calls are anchored at anchoring network devices designated for emergency calls. For example, emergency calls in an IMS+LTE network supporting VoLTE are anchored at an Emergency Access Transfer Function (EATF) of the session continuity components 114. However, conventional VoLTE networks only support a single EATF per IMS network. In these networks, the address or other information of the EATF is generally stored in the telecommunications network device 102 (e.g., an MME), and is generally fixed. This fixed information is then used during handovers of emergency calls.

As networks grow, there is an increasing need for redundancy in EATFs to support higher numbers of concurrent emergency calls. Multiple EATFs can also provide reduced round-trip latency of emergency calls between user equipment 106 and an EATF, and can permit one EATF to assume communication sessions in progress should another EATF fail. It is therefore desirable to permit handovers of emergency calls even in networks including multiple anchoring network devices.

In some examples, when an emergency call is placed, a Gateway Mobile Location Center (GMLC) determines location information of the originating user equipment 106. The location information can be determined, e.g., using information provided by the user equipment 106. Such information can include, e.g., location determined using Global Positioning System (GPS) or other location systems, radio signal strengths of multiple access networks, towers, base stations, or other radio transmitters, or dead-reckoned location determined from accelerometer data. The location information can additionally or alternatively be determined using triangulation of signals from user equipment 106 received at multiple towers or other antennas or other techniques. The GMLC can provide an Emergency Services Routing Key (ESRK) (or similar information, and likewise throughout) that identifies a PSAP to which the call should be routed. A core network device, e.g., an interrogating call session control function (I-CSCF), can then route the call to the appropriate EATF based on the ESRK.

Throughout this disclosure, other devices can be used in conjunction with listed devices. For example, a telecommunications network can include many core network devices, only some of which implement functions described herein for core network devices. Similarly, a telecommunications network can include many anchoring network devices, only some of which implement functions described herein for anchoring network devices.

Example Telecommunications Network

FIG. 2 illustrates an example telecommunications network 200. User equipment 202 communicates with access system 204 of the telecommunications network, including an MME 206 associated with a packet-switched access network 208 and a MSS 210 associated with a circuit-switched access network 212. MME 206 and MSS 210 can be examples of access devices. IP multimedia subsystem (IMS) 214 communicates with access system 204 and provides media-handling services, e.g., to route video or voice data and to maintain continuity of the communication session during handover of the communication session. The circuit-switched access network 212 may include a CS base station 216 that provides connectivity to the circuit-switched access network. The MME 206 may enable connectivity to the telecommunications network through the packet-switched access network 208, e.g., an LTE access network, which includes an eNodeB 218, e.g., a 4G base station or other access point. The IMS 214 of the telecommunications network may include a number of nodes, such as a proxy call session control function (P-CSCF) 220, a home location register (HLR)/home subscriber server (HSS) 222, an emergency call session control function (E-CSCF) 224, an I-CSCF 226, and an emergency access transfer function (EATF) 228.

The telecommunications network may also include a number of devices or nodes not illustrated in FIG. 2. Such devices or nodes may include an access transfer control function (ATCF), an access transfer gateway (ATGW), a visitor location register (VLR), a serving general packet radio service (GPRS) support node (SGSN), a gateway GPRS support node (GGSN), a policy control rules function (PCRF) node, a serving gateway (S-GW), a session border controller (SBC), or a media gateway. IMS 214 may further include a number of devices or nodes not illustrated in FIG. 2, such as a presence server and one or more additional CSCFs. A core network of the telecommunications network may be a GPRS core network or an evolved packet core (EPC) network, or may include elements from both types of core networks.

The telecommunications network may provide a variety of services to user equipment 202, such as synchronous communication routing across a public switched telephone network (PSTN). Further services may include call control, switching, authentication, billing, etc. In at least one example, IMS 214 functions and devices communicate using specific services provided by the access system 204 or elements thereof but are not directly tied to those specific services. For example, IMS 214 devices can intercommunicate using an EPC network, a GSM network, a SONET network, or an Ethernet network.

The devices and networks illustrated in FIG. 2 may be examples of the devices and networks illustrated in FIG. 1 and described above. For instance, the MME 206 may be a telecommunications network device 102, the user equipment 202 may be user equipment 106, the IMS 214 and its components 220, 222, 224, and 226 may be session continuity components 114, and the MSS 210 may be a server 112. Also, the eNodeB 218 may be an access point for the packet-switched access network 208, and the CS base station 216 may be a base station for the circuit-switched access network 212. Accordingly, the descriptions of the devices and networks of FIG. 1 apply to the devices and networks of FIG. 2.

The devices and networks of FIG. 2 may cooperate to accomplish the handover 104 shown in FIG. 1 and described above. They may also cooperate to accomplish the initialization of a communication session of user equipment 202.

In initializing the communication session, the user equipment 202 may register the communication session with the IMS 214 of the telecommunications network. To do this, the user equipment 202 sends an initiation SIP REGISTER request to the IMS 214 via the eNodeB 218 and MME 206. P-CSCF 220 of the IMS 214 may receive the SIP register request. Other components (omitted for brevity) of the IMS 214 can store information about the user equipment 202 in the HLR/HSS 222 and then send a SIP register response to the user equipment 202 to complete the IMS registration of the communication session.

In an example handover, the communication session subject to the handover is a communication session of the user equipment 202 that uses packet-switched access network 208. Such a communication session may, for instance, be an emergency voice-over-LTE (VoLTE) voice call. In the illustrated configuration, access system 204 and IMS 214 have separate handover procedures that operate in parallel to complete a handover. In some examples, the MME 206 may receive a handover indication from user equipment 202 and, in response, initiate the handover.

Upon initiating the handover, the MME 206 may select the circuit-switched access network 212 as a target access network to receive the communication session. Such a selection may also be based on one or more measurement report(s), other measurements known to the telecommunications network, or any combination thereof. The MME 206 may provide a handover request, e.g., an SRVCC PS to CS request, to an access device (e.g., an MSS 210) of the target access network. The handover request may include at least one of an IMSI for the user equipment 202, an emergency STN-SR (E-STN-SR) or other indication that the call is an emergency call, a C-MSISDN for the communication session, a generic source to target transparent container, or a mobility management (MM) context. The MME 206 may make the handover request of the MSS 210. The MME 206 may also send instructions to the user equipment 202 to prepare the user equipment for the handover. Such instruction may include, for example, a directive to automatically tune the radio of the user equipment to the circuit-switched access network 212.

In various embodiments, upon receiving the handover request, the MSS 210 performs resource allocation with the target CS base station 216 by exchanging handover request/acknowledgement messages with the CS base station 216. Once the MSS 210 has determined that the CS base station 216 can accept user equipment 202, the MSS 210 then sends a handover response to the MME 206. Such a handover response may be an SRVCC PS to CS response, which may include a target to source transparent container. The MME 206 then sends a handover command message to the user equipment 202 via eNodeB 218, instructing the user equipment 202 to tune its radio to the circuit-switched access network 212 of the CS base station 216. Handover detection then occurs at the CS base station 216, and the CS base station 216 sends a handover complete message to the MSS 210. This concludes handover of access system 204.

The MSS 210 also initiates a session transfer by sending a SIP INVITE request, which includes the E-STN-SR in this example, to the IMS 214, e.g., to I-CSCF 226. The E-STN-SR is used to direct the SIP INVITE request to the correct component of IMS 214. For an emergency call, a special-purpose or dedicated STN-SR such as the E-STN-SR can be used.

In at least one example of an emergency call, the E-STN-SR is associated with the EATF 228. I-CSCF 226 forwards the SIP INVITE to the EATF 228 based on the E-STN-SR in this example. The EATF 228 receives the SIP INVITE request and switches the session from the source access leg, i.e., network port(s) or other connection(s) to user equipment 202 via packet-switched access network 208, to the CS access leg, i.e., network port(s) or other connection(s) to user equipment 202 via circuit-switched access network 212. EATF 228 then sends one or more transmissions to release the source access leg, and responds to the SIP INVITE request of the MSS 210, completing the session transfer. The conversation partner device is not made aware of the session transfer. This concludes handover of the IMS 214.

Anchoring emergency calls at EATF 228 permits completing and handing over emergency calls even if other components of the IMS 214, e.g., an ATCF, serving call session control function (S-CSCF), or Service Centralization and Continuity Application Server (SCC AS), are not operational.

In some examples, as shown, IMS 214 includes a plurality of E-CSCFs 224 and EATFs 228. I-CSCF 226 is configured to determine which of the EATFs 228 is anchoring the emergency communication session. Examples are discussed below with reference to FIGS. 5, 6, 7, 8, and 9. In some examples, each E-CSCF 224 is communicatively connected with a respective single EATF 228.

For clarity, the above discussion is in the context of a handover from packet-switched access network 208 to circuit-switched access network 212. However, corresponding components and functions described above can be used for handovers from circuit-switched access network 212 to packet-switched access network 208, or for handovers between other types of networks.

Example Devices

FIG. 3 illustrates a component level view of user equipment 300 capable of at least some of connecting to a plurality of access networks, measuring those access networks, providing measurement reports, engaging in a communication session such as an emergency call, or switching access networks during the communication session. User equipment 300 may be any sort of user equipment, such as user equipment 106, 116, or 202. As illustrated, user equipment 300 comprises a system memory 302 storing communication client(s) 304, SRVCC module 306, SIP client 308, and radio resource control 310. Also, example user equipment 300 includes processor(s) 312, a removable storage 314, a non-removable storage 316, a radio 318, a display 320, output device(s) 322, input device(s) 324, and one or more antenna(s) 326 connected to radio 318. Processor 312, radio 318, system memory 302, and other illustrated components of user equipment 300 can be communicatively coupled via bus 328, e.g., a PCI or other computer bus.

In various embodiments, system memory 302 is volatile (such as RAM), non-volatile (such as ROM, flash memory, etc.), or some combination of the two. The communication client(s) 304 stored in the system memory 302 may enable user equipment 300 to initiate and carry on communication sessions. The communication client(s) 304 may include voice call handlers, video calling clients, gaming and media clients, etc. The communication client(s) 304 may utilize a policy, preferences, etc. in determining which of a number of available access networks the communication client(s)

304 should use in initiating communication sessions. For example, the communication client(s) 304 may utilize a policy or preference that prefers LTE access networks to GSM access networks, and GSM access networks to other circuit-switched access networks.

The SRVCC module 306 may perform a number of functions, such as interfacing with the radio 318 through the radio resource control 310, receiving instructions, such as instructions preparing user equipment 300 for a handover or instructions to complete a handover by tuning the radio 318, performing measurements of access networks, generating measurement reports that include the measurements, and providing the measurement reports to the telecommunications network. Further details of functions that may be performed by SRVCC module 306 are discussed below with reference to FIGS. 5, 6, 7, 8, and 9.

The SIP client 308 may participate with the communication client(s) 304 in initiating a communication session by, for example, formulating a SIP REGISTER request and sending the SIP REGISTER request to the telecommunications network.

The radio resource control 310 may, for example, be a radio resource control layer of user equipment 300 and may interact with the radio 318 and other modules and components of user equipment 300 in order to tune the radio 318 and communicate using the radio 318.

In some embodiments, the processor(s) 312 is a central processing unit (CPU), a graphics processing unit (GPU), or both CPU and GPU, or any other sort of processing unit. Example processing units include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and processors incorporating more than one type of device (e.g., a CPU and an FPGA on a single die).

User equipment 300 also includes additional data storage devices (removable and/or non-removable) such as, for example, magnetic disks, optical disks, or tape. Such additional storage is illustrated by removable storage 314 and non-removable storage 316, although any given user equipment 300 may have neither of those, or may only have one of those. Tangible computer-readable media may include volatile and nonvolatile, removable and non-removable media implemented in any method or technology for storage of information, such as computer readable instructions, data structures, program modules, or other data. System memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by user equipment 300. Any such tangible computer-readable media may be part of user equipment 300.

In some embodiments, the radio 318 includes any sort of radio known in the art. For example, radio 318 may be a radio transceiver that performs the function of transmitting and receiving radio frequency communications. The radio 318 and radio resource control 310 may facilitate wireless connectivity between user equipment 300 and various cell towers, base stations and/or access points of access networks, e.g., packet-switched or circuit-switched networks.

In various embodiments, the display 320 is a liquid crystal display (LCD), organic light-emitting diode (OLED) display, or any other type of display commonly used in telecommunication devices. For example, display 320 may be a touch-sensitive display screen, and can then also act as an input device or keypad, such as for providing a soft-key keyboard, navigation buttons, or the like.

In some embodiments, the output devices 322 include any sort of output devices known in the art, such as a display (already described as display 320), speakers, a vibrating mechanism, or a tactile feedback mechanism. Output devices 322 also include ports for one or more peripheral devices, such as headphones, peripheral speakers, or a peripheral display.

In various embodiments, input devices 324 include any sort of input devices known in the art. For example, input devices 324 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 4 illustrates a component level view of a telecommunications network device 400 capable of managing a handover of a communication session of user equipment, e.g., from a packet-switched access network to a circuit-switched access network. The telecommunications network device 400 may represent any sort of user equipment or core network device, such as telecommunications network device 102, MSS 210, MME 206, I-CSCF 226, E-CSCF 224, or EATF 228. As illustrated, the telecommunications network device 400 comprises a system memory 402 storing a handover module 404, mapping data 406, and a SIP module 408. The SIP module 408 may be configured as a SIP user-agent client (UAC), user-agent server (UAS), proxy, or B2BUA. Also, the telecommunications network device 400 includes processor(s) 410 and may include at least one of a removable storage 412, a non-removable storage 414, transceiver(s) 416, output device(s) 418, or input device(s) 420, any or all of which can be communicatively connected via bus 422. In some embodiments, the processor(s) 410 is a central processing unit (CPU), a graphics processing unit (GPU), or both CPU and GPU, or any other sort of processing unit described above with reference to processor 312. In some embodiments, system memory 402 is volatile (such as RAM), non-volatile (such as ROM, flash memory, etc.), or some combination of the two.

The handover module 404 stored in the system memory 402 may perform a number of functions, including initiating a handover of a communication session based on measurement reports, selecting a circuit-switched access network for the handover, providing a handover request to a server associated with the circuit-switched access network, either directly or through an MME, receiving a handover response, and instructing user equipment to connect to the circuit-switched access network to complete the handover. The handover module 404 may additionally or alternatively transmit handover queries or invitation messages, receive indications of session anchoring, query anchoring network devices, or query memory devices such as an HLR/HSS. Further details of example functions that may be performed by handover module 404 are discussed below with reference to FIGS. 5, 6, 7, 8, and 9.

The mapping data 406 may include mappings of circuit-switched access networks to servers, such as MSSs. The mapping data 406 may additionally or alternatively include addresses or other identification of E-CSCFs 224 or EATFs 228 for communication sessions in progress. For example, the mapping data 406 may include a geographical database or other information permitting mapping of values carried in a P-Access-Network-Information ("PANI") header to an appropriate EATF or E-CSCF. Such values ("PANI information") can be added to a SIP request by the UE or an access-network device, e.g., an eNodeB. In some examples, the address of the user equipment can include PANI information.

In some examples, E-CSCFs and EATFs are geographically dispersed in the network and the mapping data 406 maps from the cellular location of the UE (e.g., base station ID or latitude/longitude) to the geographically nearest E-CSCF or EATF, or to the geographically nearest E-CSCF or EATF taking into account both physical location and network topology. For example, emergency calls from a particular city or other geographic area may be routed to an E-CSCF in that city based in PANI information. Session transfer requests (e.g., handover initiations) may also be routed to an appropriate E-CSCF based on PANI information.

The SIP module 408 may enable user equipment to perform a SIP registration for a communication session with an IMS or other session continuity components.

The example telecommunications network device 400 also includes additional data storage devices (removable and/or non-removable) such as, for example, magnetic disks, optical disks, or tape. Such additional storage is illustrated in FIG. 4 by removable storage 412 and non-removable storage 414. System memory 402, removable storage 412 and non-removable storage 414 are all examples of computer-readable storage media. Tangible computer-readable media and computer-readable storage media can be as discussed above with reference to removable storage 314 and non-removable storage 316.

In some embodiments, the transceivers 416 include any sort of transceivers known in the art. For example, transceivers 416 may include a radio transceiver that performs the function of transmitting and receiving radio frequency communications. Also, or instead, the transceivers 416 may include other wireless or wired connectors, such as Ethernet connectors or near-field antennas. The transceivers 416 may facilitate connectivity between a public network, such as packet-switched access network 208, and one or more other devices of a telecommunications network.

In some embodiments, the output devices 418 include any sort of output devices known in the art, such as a display, speakers, a vibrating mechanism, or a tactile feedback mechanism. Output devices 418 also include ports for one or more peripheral devices, such as headphones, peripheral speakers, or a peripheral display.

In various embodiments, input devices 420 include any sort of input devices known in the art. For example, input devices 420 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 5:
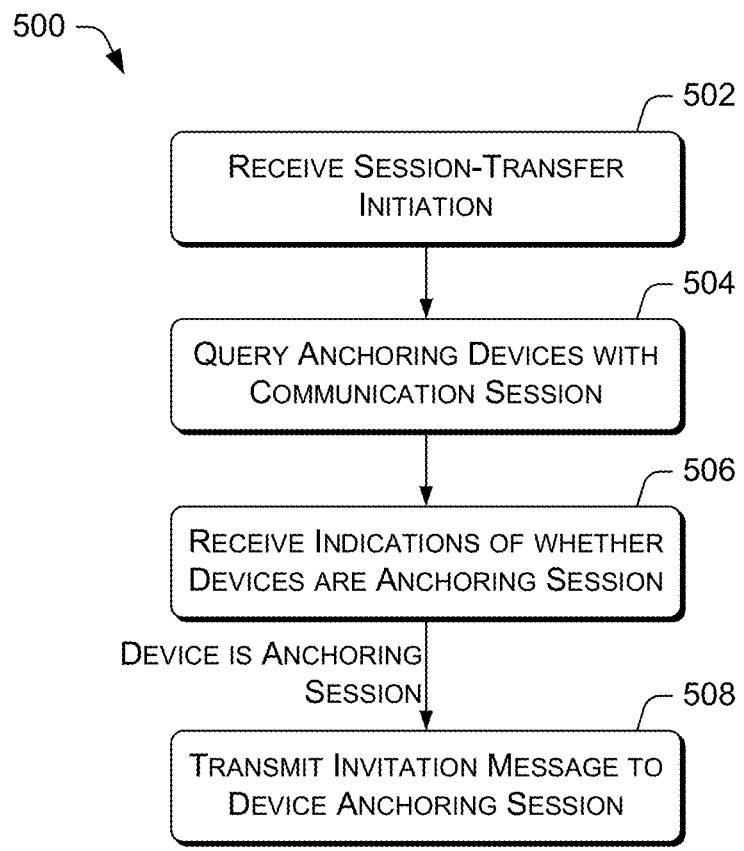
FIG. 5 illustrates an example process performed by a telecommunications network device for maintaining continuity of a communication session during a handover.
Figure 6:
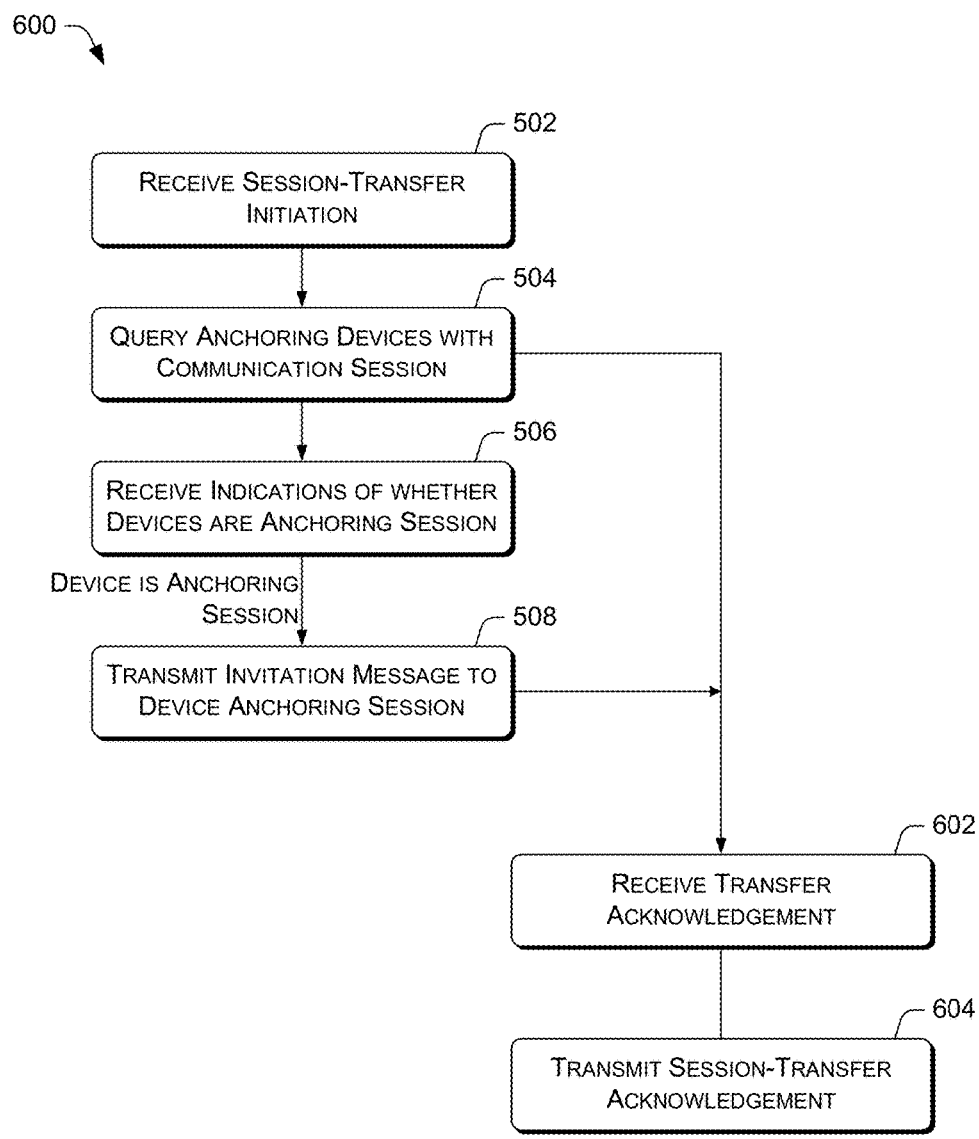
FIG. 6 illustrates an example process performed by a telecommunications network device for maintaining continuity of a communication session during a handover.
Figure 7:
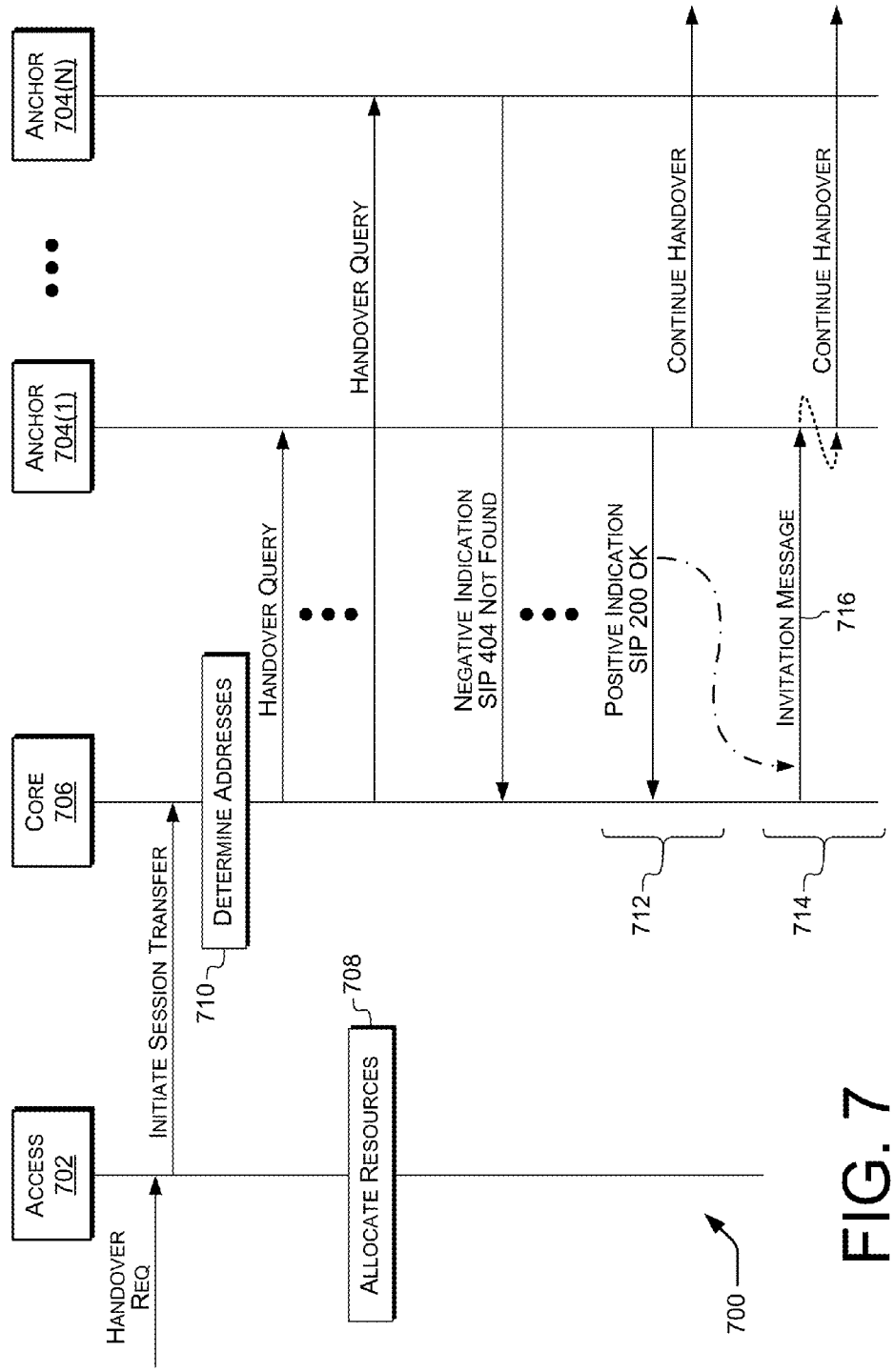
FIG. 7 is a call flow showing an example of the process shown in FIG. 6.
Figure 8:
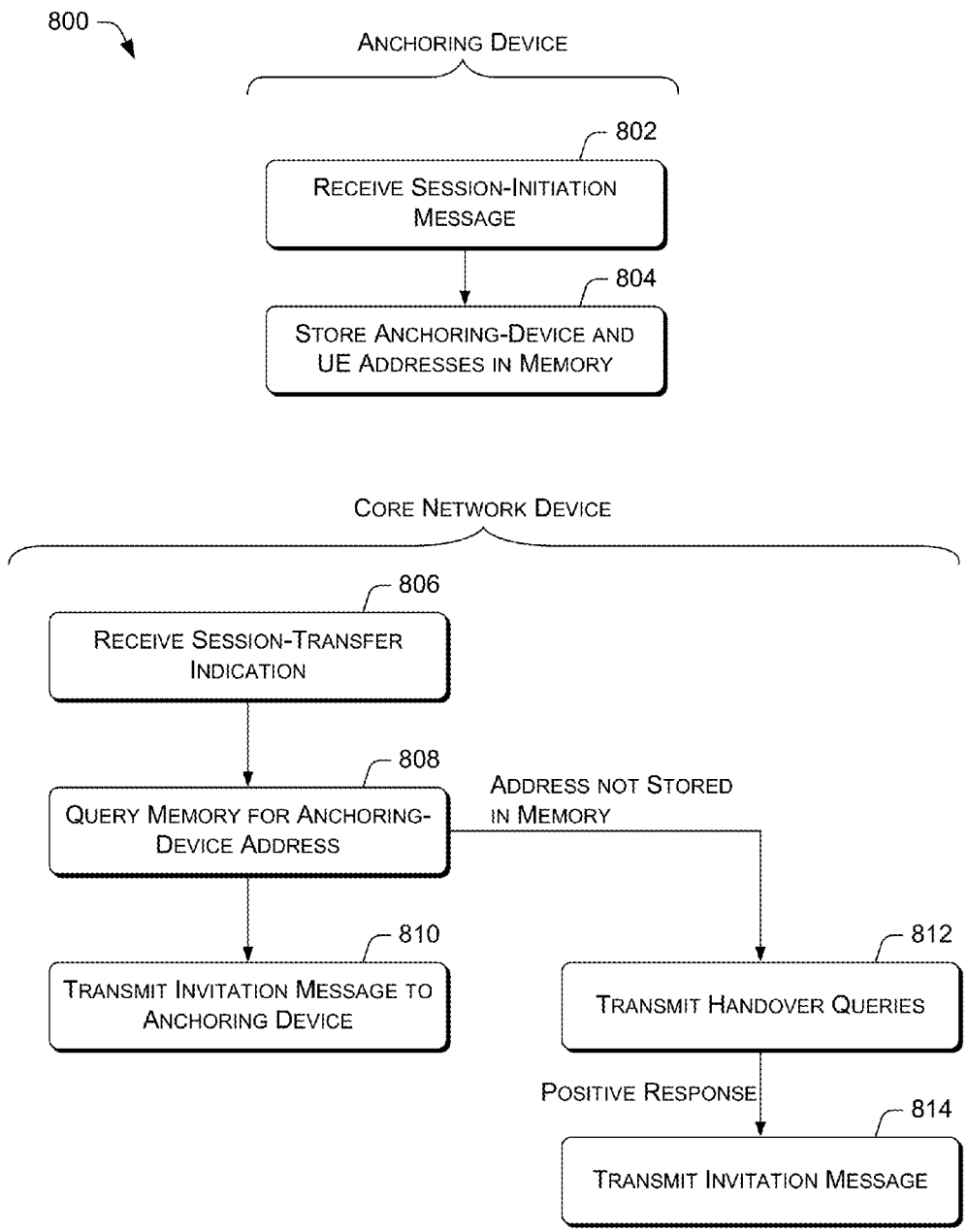
FIG. 8 illustrates an example process performed by a telecommunications network device for maintaining continuity of a communication session during a handover.
Figure 9:
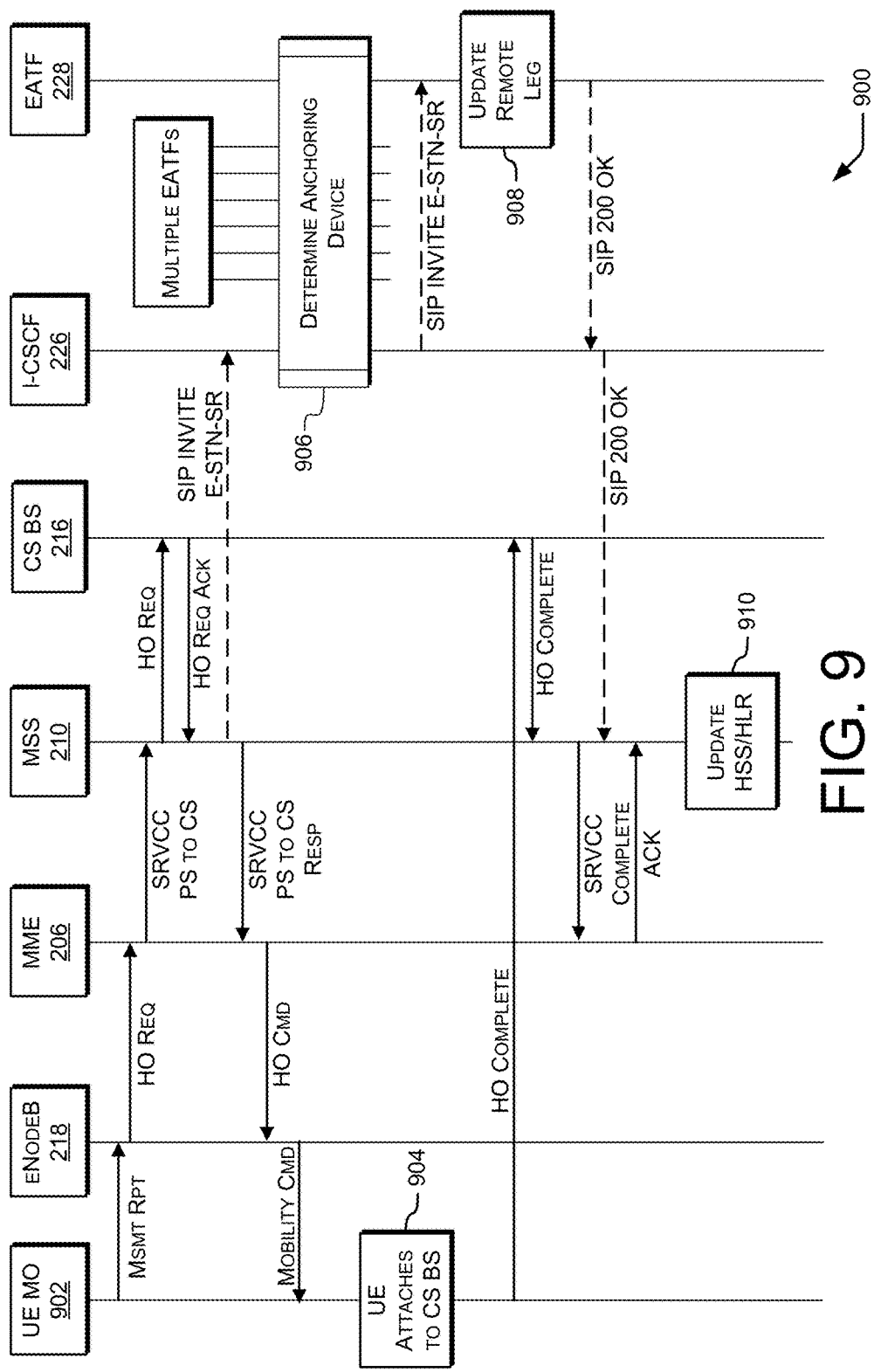
FIG. 9 is a call flow showing an example handover.

FIGS. 5, 6, and 8 illustrate example processes. These processes are illustrated as logical flow graphs, each operation of which represents one or more operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Similarly, the order of data exchanges shown in example call flows of FIGS. 7 and 9 is not intended to be construed as a limitation.

FIG. 5 illustrates an example process 500 performed by a core network device of a telecommunications network for maintaining continuity of an emergency communication session during handover. In some examples, the core network device is I-CSCF 226, FIG. 2, or another core network device.

The process includes, at 502, receiving an initiation of a session transfer of user equipment for the emergency communication session. For example, the session transfer can be a handover from a first access network of a first type to a second access network of a second, different type. The initiation can be represented by a session-transfer indication, e.g., a handover request. In some examples, the first type is a packet-switched type and the second type is a circuit-switched type. The initiation may include a SIP INVITE or other message received by the core network device. The initiation may be received during a pre-establishment phase of a communication session (e.g., pre-alerting or alerting), or during an established phase of the communication session.

At 504, the core network device queries a plurality of anchoring network devices. For example, the core network device can transmit respective handover queries to each of the plurality of anchoring network devices. Examples of anchoring network devices can include, e.g., EATFs 228, FIG. 2, ATCFs, SCC ASes, or any combination thereof. Each of the anchoring network devices can be configured to proxy (or otherwise anchor, and likewise throughout) signaling traffic for one or more communication sessions. The handover queries can include information identifying the calling party or the communication session, e.g., the IMSI or C-MSISDN of the user equipment of the calling party. The handover queries can be transmitted serially, in parallel, or in any combination. Only the anchoring network device associated with the communication session will provide a positive indication in response to the handover query. In some examples, if multiple anchoring network devices provide positive indications, the core network device can select one, e.g., randomly, in priority order, or using a load-balancing algorithm.

In some examples, block 504 includes retrieving respective addresses of the anchoring network devices from a computer-readable medium. For example, the core network device can include or be communicatively connected with a memory 402 storing addresses of the anchoring network devices (e.g., in mapping data 406). In other examples, block 504 can include requesting address(es) of anchoring network device(s) from a central server, e.g., a management server.

At 506, the core network device receives from individual ones of the anchoring network devices respective indications of whether the emergency communication session is being proxied (or otherwise anchored, and likewise throughout) by the respective anchoring network devices. For example, the core network device can receive indications from all of the anchoring network devices. The indications can include, e.g., SIP response codes such as 4xx for a negative response (not being proxied) or 1xx or 2xx for a positive response (being proxied). Example positive response codes can include SIP 100 Trying or, e.g., when the handover query includes a SIP INVITE, SIP 180 Ringing. In some examples, the communication session is anchored at exactly one of the anchoring network devices, so only one of the anchoring network devices will respond with a positive indication, i.e., an indication that the emergency communication session is indeed being proxied by that one of the anchoring network devices. In some examples, the core network device can receive an indication from a particular one of the anchoring network devices that the emergency communication session corresponds to the particular one of the anchoring network devices.

Querying the anchoring network devices using the core network device permits distributing communication sessions among anchoring network devices while maintaining security of the network infrastructure. In some examples, the user equipment communicates with the core network device (e.g., I-CSCF 226) via P-CSCF 220. In some of these examples, P-CSCF 220 suppresses Via headers or Service Route headers in the SIP messages exchanged between the user equipment and the core network device. This permits the user equipment to communicate with the core network device but does not reveal internal details of the network, increasing security and robustness. Querying of the anchoring network devices by the core network device provides improved isolation between the user equipment and the anchoring network devices.

In some examples, each handover query includes an invitation message of the emergency communication session, e.g., a SIP INVITE request. The identifying information of the communication session can be carried, e.g., as the Request-URI (Uniform Resource Identifier) or as the value of a header in the SIP request. The core network device can fork the SIP INVITE, e.g., from the MSS 210, to each of the anchoring network devices. In some of these examples, exactly one of the anchoring network devices returns a positive indication, e.g., a SIP 200 OK response. The others of the anchoring network devices return no response (e.g., within a selected timeout), or return negative indications such as SIP 4xx or 5xx responses. In some examples, the negative indication includes a SIP 404 Not Found response.

In some examples, the handover queries do not include invitation requests. In some examples, when one of the anchoring network devices provides a positive indication, block 506 is followed by block 508.

At 508, in some examples, the core network device transmits an invitation message to the one of the anchoring network devices that provided a positive indication in response to the respective handover query (block 504). For example, the core network device can transmit an invitation message of the emergency communication session to the particular one of the anchoring network devices. In some examples, blocks 506 and 508 are performed in the pre-established or established stages of a communication session. Accordingly, when the handover queries are transmitted, in some examples, exactly one of the anchoring network devices is anchoring the communication session. Therefore, in some examples, only one anchoring network device responds to the respective handover query.

In some of these examples, each handover query includes a SIP INFO request. Identifying information of the called party or communication session can be carried, e.g., in a header in the SIP INFO request. Positive indications can be represented by SIP 200 OK responses to the INFO request, and negative indications can be represented by SIP 4xx or 5xx responses, e.g., a 404 Not Found or 480 Temporarily Unavailable response.

In some examples, the invitation message includes a SIP INVITE request. At block 508, the core network device can transmit the INVITE only to the anchoring network device known to be anchoring the communication session.

Forking the INVITE can permit more rapidly processing handovers. This can increase capacity. Sending non-invitation handover queries, e.g., SIP INFO messages, can permit using reduced bandwidth in determining which anchoring network device is anchoring the communication session. For example, SIP INFO requests can be smaller and have smaller payloads then SIP INVITE requests. This can also increase capacity. In some examples, the core network device can send invitation handover queries to some of the anchoring network devices and non-invitation handover queries to others of the anchoring network devices.

FIG. 6 illustrates an example process 600 performed by a core network device of a telecommunications network (e.g., an I-CSCF 226) for maintaining continuity of an emergency communication session during handover. Blocks 502, 504, 506, and 508 can be as described above with reference to FIG. 5. Block 504 or block 508 can be followed by block 602.

At 602, the core network device can receive a transfer acknowledgement from a particular one of the anchoring network devices. The transfer acknowledgement can include, e.g., a SIP 200 OK response to a SIP INVITE transmitted at block 504 or block 508.

At 604, in response to the received transfer acknowledgement, the core network device can transmit a session-transfer acknowledgement. For example, the core network device can include an I-CSCF and the session-transfer acknowledgement can include a SIP 200 OK in response to a SIP INVITE from the access device, e.g., an MSC.

FIG. 7 is a partial call flow 700 showing examples of processes discussed above with reference to FIG. 5. The call flow of FIG. 7 includes a first access device 702 communicatively connected with an access network of a selected type. For example, the first access device can include an MSC or MSS of a CS access network. Anchoring network devices 704(1)-704(N) (individually or collectively referred to herein with reference 704) can be configured to anchor communication sessions. For example, each anchoring network device 704 can include an EATF. Core network device 706 can be, e.g., an I-CSCF.

As shown, access device 702 receives a handover request associated with an emergency communication session of user equipment and, in response, initiates a session transfer of the emergency communication session. For example, access device 702 can receive the handover request including an emergency session transfer number-single radio (E-STN-SR). The session-transfer indication can include a SIP INVITE specifying the E-STN-SR in the Request-URI.

In some examples, at 708, in response to the handover request, the access device 702 allocates access network resources for the emergency communication session. Network resources can include radio channels or timeslots or backhaul bandwidth, e.g., to provide a desired quality of service (QoS).

In response to the initiated session transfer, at 710, core network device 706 can determine respective addresses of the anchoring network devices 704. Core network device 706 can then transmit respective handover queries to the anchoring network devices 704 using the determined addresses. In some examples, block 710 includes using hard-coded addresses or retrieving addresses from a lookup table. The handover queries can be transmitted serially, waiting for a response or timeout before sending each successive handover query, or in parallel, or any combination.

In some examples, a computer-readable memory such as system memory 402 stores respective addresses of the anchoring network devices 704. In some of these examples, at 710, the core network device 706 retrieves the addresses from the computer-readable memory. The core network device 706 then transmits the handover queries to the respective retrieved addresses.

In response to the respective handover query, each anchoring network device can provide a respective indication of whether the emergency communication session is being proxied by that anchoring network device. In the illustrated example, the communication session is anchored at anchoring network device 704(1). Accordingly, in this example, anchoring network device 704(1) responds with a positive indication in the form of a SIP 200 response, and the other anchoring network devices 704(2)-704(N) respond with respective negative indications in the form of respective SIP 404 responses.

In some examples, e.g., as discussed above with reference to block 504, FIG. 5, the handover query includes a SIP INVITE request or other invitation message. As indicated at 712, anchoring network device 704(1) can continue handover processing in these examples in response to the SIP INVITE.

In some examples, e.g., as discussed above with reference to blocks 504 and 508, FIG. 5, the handover query includes a SIP INFO request or other non-invitation message. As indicated at 714, in response to the SIP 200 OK or other positive indication from anchoring network device 704(1), core network device 706 can transmit an invitation message 716 to anchoring network device 704(1). Anchoring network device 704(1) can then continue handover processing in response to the invitation message 716 subsequent to the handover query. The invitation message 716 can be transmitted in response to a positive indication, e.g., a SIP 200 OK response to the non-invitation handover query. This is represented graphically by the dash-dot arrow.

FIG. 8 illustrates an example process 800 performed by an anchoring network device (e.g., an EATF 228) and a core network device (e.g., an I-CSCF 226) of a telecommunications network for maintaining continuity of an emergency communication session during handover. In some examples, a system includes a computer-readable memory and at least one of an anchoring network device and a core network device configured to perform respective functions discussed below with reference to FIG. 8.

At 802, the anchoring network device receives a session-initiation message, e.g., a SIP INVITE. The session-initiation message indicates an address of user equipment, e.g., an IMSI, C-MSISDN, Internet Protocol (IP) v4 or IPv6 address, or globally unique identifier (GUID). The address can be carried, e.g., in a "From" header of a SIP INVITE.

At 804, the anchoring network devices stores in a computer-readable memory, e.g., of an HSS such as HLR/HSS 222, FIG. 2, an address of the anchoring network device in association with the address of the user equipment. For example, the anchoring network device can transmit a Diameter Profile Update Request to an HSS including the C-MSISDN of the calling party's user equipment and the anchoring network device's address.

At 806, a core network device, e.g., an I-CSCF 226, receives a session-transfer indication for an emergency communication session of the user equipment. The session-transfer indication can include, e.g., a SIP INVITE.

At 808, the core network device queries the memory using the address of the user equipment to retrieve the address of the anchoring network device. For example, the core network device can transmit a Diameter User Data Request including the C-MSISDN of the user equipment and receive the stored EATF address. In some examples, the memory responds to the query with an indication of whether the address of the user equipment is stored in the memory.

At 810, the core network device can transmit an invitation message to the anchoring network device using the retrieved address. The invitation message can include, e.g., a SIP INVITE specifying an E-STN-SR.

In some examples, a system including the anchoring network device and the core network device further includes one or more additional anchoring network devices. In some examples, block 808 can be followed by block 812.

At 812, in response to an indication from the memory that the address of the user equipment is not stored in the memory, the core network device transmits respective handover queries to the anchoring network devices. This can be done, e.g., as discussed above with reference to FIGS. 5, 6, and 7.

At 814, in some examples, in response to a positive handover-query response from one of the anchoring network devices, the core network device transmits an invitation message to that one of the anchoring network devices. This can be done, e.g., as discussed above with reference to block 508, FIG. 5.

FIG. 9 is a call flow 900 showing an example call handover, e.g., as discussed above with reference to FIGS. 5, 6, 7, and 8. The call flow of FIG. 9 is between an originating UE 902 ("UE MO") and a terminating UE (omitted for brevity). Originating UE 902 has placed the call or otherwise initiated the communication session. The terminating UE is the target of the communication session. ENodeB 218, MME 206, MSS 210, CS base station (BS) 216, I-CSCF 226, and EATF 228 are as described above with reference to FIG. 2. Communications with components of IMS 214 are shown dashed for clarity. In some examples, handovers are conducted as described in 3GPP TS 23.216 (ETSI TS 123 216), e.g., FIG. 6.2.2.1-1 of ver. 12.2.0, and in 3GPP TS 23.237 (ETSI TS 123 237), e.g., FIG. 6c.2-1 of ver. 12.8.0.

As shown, originating UE 902 sends a measurement report, which triggers a handover request ("HO Req") from eNodeB 218 to MME 206, a corresponding SRVCC PS to CS request from MME 206 to MSS 210, and a handover request from MSS 210 to CS BS 216. MSS 210 also sends a session transfer indication to I-CSCF 226 or another core network device (and likewise throughout). The session transfer indication in the illustrated example includes a SIP INVITE message including an E-STN-SR. I-CSCF 226 can respond to the session transfer indication, e.g., with a SIP 100 Trying response (omitted for brevity). In some examples, the SIP INVITE or other session transfer indication can be provided by a Media Gateway Control Function (MGCF), e.g., that bridges between SIP signaling and PSTN signaling used for PSTN-connected PSAPs.

At 904, originating UE 902 attaches to CS BS 216. In some examples, originating UE 902 supports dual attach, so the connection to eNodeB 218 is not broken at 904.

At 906, I-CSCF 226 determines which anchoring network device (e.g., EATF) is anchoring the communication session. This can be done, e.g., as described above with reference to any of FIG. 5, 6, 7, or 8. For example, I-CSCF 226 can transmit handover queries or invitation messages, or query memory. The anchoring network device can transmit an indication of whether or not the communication session is anchored at the anchoring network device, e.g., a SIP 200 or 4xx response, respectively. As shown, block 906 can involve communicating with multiple anchoring network devices, e.g., multiple EATFs 228.

In some examples, once I-CSCF 226 has determined which anchoring network device is anchoring the communication session, I-CSCF 226 can transmit an invitation message. e.g., a SIP INVITE, to the anchoring network device (e.g., EATF 228). In other examples, the invitation message is transmitted during block 906 (e.g., using INVITE forking as described above with reference to, e.g., blocks 504 and 506, FIG. 5).

At 908, in some examples, the anchoring network device can update the remote leg of the communication session. This can be done, e.g., in response to the SIP INVITE from the core network device, or another invitation message transmitted during or after block 906. For example, the anchoring network device can communicate to the terminating UE information about post-handover media or signaling paths to originating UE 902. Block 908 can include communicating with terminating-side components via an E-CSCF 224 (omitted for brevity).

At 910, in some examples, the MSS 210 can update an HSS or HLR with information about the access network to which originating UE 902 is now connected. This can be done subsequent to a handover-complete message from originating UE 902 to CS BS 216, a consequent handover-complete message from CS BS 216 to MSS 210, and a following SRVCC complete response and acknowledgement between MSS 210 and MME 206.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A telecommunications network, comprising:
a computer-readable memory;
an access device comprising:
a transceiver communicatively connectable with an access network of a selected type; and
a processor of the access device configured to, via the transceiver of the access device, receive a handover request associated with an emergency communication session of user equipment and, in response, initiate a session transfer of the emergency communication session;
a plurality of Emergency Access Transfer Function (EATF) network devices, each comprising:
a respective transceiver communicatively connectable with a core network device; and
a respective processor configured to, via the respective transceiver, proxy signaling traffic for one or more communication sessions; and
the core network device comprising:
a transceiver of the core network device communicatively connectable with the plurality of EATF network devices; and
a processor of the core network device configured to:
query the computer-readable memory using an address of the user equipment to determine whether the address of the user equipment is stored in the computer-readable memory;
determine respective addresses of the plurality of EATF network devices in response to the initiated session transfer; and
transmit respective handover queries to the EATF network devices via the transceiver of the core network device using the determined respective addresses in response to the initiated session transfer and to the address of the user equipment not being stored in the computer-readable memory;
wherein the respective processor of each EATF network device is further configured to, in response to the respective handover query, provide a respective indication of whether the emergency communication session is being proxied by that EATF network device; and
wherein the respective processor of at least one of the EATF network devices is configured to store address (es) of user equipment device(s) in the computer-readable memory in association with an address of the at least one of the EATF network devices.

2. The telecommunications network according to claim 1, the core network device further comprising a second computer-readable memory storing the respective addresses of the EATF network devices, wherein the processor of the core network device is further configured to retrieve the respective addresses from the second computer-readable memory and transmit the handover queries to the respective retrieved addresses.

3. The telecommunications network according to claim 1, wherein the processor of the core network device is further responsive to a positive indication from a first EATF network device of the plurality of EATF network devices to transmit an invitation message to the first EATF network device via the transceiver.

4. The telecommunications network according to claim 3, wherein each handover query includes a Session Initiation Protocol (SIP) INFO request and the invitation message includes a SIP INVITE request.

5. The telecommunications network according to claim 3, wherein the processor of the core network device is further configured to:
receive, via the transceiver of the core network device, a transfer acknowledgement from the first EATF network device; and
in response, transmit a session-transfer acknowledgement.

6. The telecommunications network according to claim 1, wherein each handover query includes a SIP INVITE request.

7. The telecommunications network according to claim 1, further comprising a second access device communicatively connected with a second access network of a selected second type, the second access device comprising:

a transceiver of the second access device; and a processor of the second access device configured to receive a handover indication from the user equipment via the transceiver of the second access device and, in response, provide the handover request to the access device.

8. The telecommunications network according to claim 1, wherein the processor of the access device is further configured to allocate access network resources for the emergency communication session in response to the handover request.

9. The telecommunications network according to claim 1, wherein the access device comprises at least a mobile switching center (MSC) or MSC server (MSS) and the core network device comprises an Interrogating Call Session Control Function (I-CSCF).

10. The telecommunications network according to claim 1, wherein the handover request includes an emergency session transfer number-single radio (E-STN-SR).

11. The telecommunications network according to claim 1, wherein:
the respective indication associated with a particular EATF network device comprises a positive indication if the emergency communication session is being proxied by that EATF network device; and
the processor of the core network device is further configured to determine that only a first one of the EATF network devices has provided the positive indication.

12. The telecommunications network according to claim 1, the core network device further comprising a second computer-readable memory, wherein the processor of the core network device is further configured to, before transmitting the respective handover queries, determine that an address of the user equipment is not stored in the second computer-readable memory.

13. One or more computer-readable storage media comprising instructions that, when executed by one or more processors, cause the one or more processors to perform:
first operations comprising:
receiving a handover request associated with an emergency communication session of user equipment; and
in response, initiating a session transfer of the emergency communication session;
second operations comprising:
querying a computer-readable memory using an address of the user equipment to determine whether the address is stored in the computer-readable memory;
determining respective addresses of Emergency Access Transfer Function (EATF) network devices in response to the initiated session transfer; and
transmitting respective handover queries to the EATF network devices using the determined respective addresses in response to the initiated session transfer and to the address of the user equipment not being stored in the computer-readable memory; and
third operations comprising:
storing address(es) of user equipment device(s) in the computer-readable memory in association with an address of the at least one of the EATF network devices;
proxying signaling traffic for one or more communication sessions; and
in response to a first handover query of the handover queries, providing an indication of whether the emergency communication session is being proxied by at least one of the one or more processors.

14. The one or more computer-readable storage media according to claim 13, the second operations further comprising retrieving the respective addresses from the computer-readable memory.

15. The one or more computer-readable storage media according to claim 13, the second operations further comprising:
receiving a positive indication from a first EATF network device of the EATF network devices; and
transmitting an invitation message to the first EATF network device.

16. The one or more computer-readable storage media according to claim 15, wherein the second operations further comprise:
determining the respective handover queries including respective Session Initiation Protocol (SIP) INFO requests; and
determining the invitation message including a SIP INVITE request.

17. The one or more computer-readable storage media according to claim 13, wherein the second operations further comprise determining the respective handover queries including respective SIP INVITE requests.

18. The one or more computer-readable storage media according to claim 13, further comprising instructions that, when executed by one or more processors, cause the one or more processors to perform fourth operations comprising:
receiving a handover indication from the user equipment; and
in response, transmitting the handover request.

19. The one or more computer-readable storage media according to claim 13, the first operations further comprising allocating access network resources for the emergency communication session in response to the handover request.

20. A method, comprising, under control of one or more processors:
storing address(es) of user equipment device(s) in a computer-readable memory in association with an address of at least one of a plurality of Emergency Access Transfer Function (EATF) network devices;
receiving a handover request associated with an emergency communication session of user equipment;
in response, initiating a session transfer of the emergency communication session;
querying the computer-readable memory using an address of the user equipment to determine whether the address of the user equipment is stored in the computer-readable memory;
determining respective addresses of at least some EATF network devices of the plurality of EATF network devices in response to the initiated session transfer;
transmitting respective handover queries to the at least some EATF network devices using the determined respective addresses at least in response to the address of the user equipment not being stored in the computer-readable memory;
proxying signaling traffic for one or more communication sessions; and
in response to a first handover query of the respective handover queries, providing an indication of whether the emergency communication session is being proxied by at least one of the one or more processors.

* * * * *